US005079692A

United States Patent [19]

Takeda

[11] Patent Number: 5,079,692

[45] Date of Patent: Jan. 7, 1992

[54] CONTROLLER WHICH ALLOWS DIRECT ACCESS BY PROCESSOR TO PERIPHERAL UNITS

[75] Inventor: Hiroshi Takeda, Kodaira, Japan

[73] Assignee: Hitachi, Ltd., Tokyo, Japan

[21] Appl. No.: 399,413

[22] Filed: Aug. 25, 1989

Related U.S. Application Data

[63] Continuation of Ser. No. 886,821, Jul. 18, 1986, abandoned.

[30] Foreign Application Priority Data

Jul. 24, 1985 [JP] Japan ............................... 60-161886

[51] Int. Cl.[5] ...................... G06F 12/00; G06F 12/06; G06F 13/16

[52] U.S. Cl. ................................ 395/275; 364/238.4; 364/241.2; 364/240; 364/926.92; 364/935; 364/935.4; 364/134; 340/799; 364/DIG. 1; 364/DIG. 2

[58] Field of Search ... 364/200 MS File, 900 MS File, 364/134; 340/750, 798, 799

[56] References Cited

U.S. PATENT DOCUMENTS

| | | | |
|---|---|---|---|
| 4,070,710 | 1/1978 | Sukonick et al. | 364/900 |
| 4,200,916 | 4/1980 | Seipp | 364/900 |
| 4,263,648 | 4/1981 | Stafford | 364/200 |
| 4,293,908 | 10/1981 | Bradley et al. | 364/200 |
| 4,368,512 | 1/1983 | Kyu et al. | 364/200 |
| 4,379,340 | 4/1983 | Holtey et al. | 364/900 |
| 4,398,246 | 8/1983 | Frediani et al. | 364/200 |
| 4,415,985 | 11/1983 | McDaniel | 364/900 |
| 4,449,202 | 5/1984 | Knapp et al. | 364/900 |
| 4,460,957 | 7/1984 | Eggebrecht et al. | 364/200 |
| 4,460,960 | 7/1984 | Anderson et al. | 364/200 |
| 4,462,084 | 7/1984 | Greenwood | 364/900 |
| 4,467,447 | 8/1984 | Takahashi et al. | 364/900 |
| 4,511,965 | 4/1985 | Rajaram | 364/200 |
| 4,513,390 | 4/1985 | Walter et al. | 364/900 |
| 4,527,250 | 7/1985 | Galdun et al. | 364/900 |
| 4,543,629 | 9/1985 | Carey et al. | 364/200 |
| 4,558,412 | 12/1985 | Inoshita et al. | 364/200 |
| 4,570,220 | 2/1986 | Tetrick | 364/200 |
| 4,577,344 | 3/1986 | Warren et al. | 364/134 |
| 4,602,327 | 7/1986 | LaViolette et al. | 364/200 |
| 4,615,018 | 9/1986 | Sakano | 364/900 |
| 4,622,547 | 11/1986 | Furukawa et al. | 340/750 |
| 4,641,237 | 2/1987 | Yabushita et al. | 364/200 |
| 4,703,420 | 10/1987 | Irwin | 364/200 |
| 4,742,454 | 3/1988 | Robinson et al. | 364/200 |
| 4,757,310 | 7/1988 | Katsara et al. | 340/802 |
| 4,906,986 | 3/1990 | Takeda | 340/747 |

OTHER PUBLICATIONS

"System Construction of CRT Controller Having Graphic Drawing Function", Nikkei Electronics, 1984, 5.21, pp. 225-227.

*Primary Examiner*—Thomas C. Lee

*Assistant Examiner*—Mehmet Geckil

*Attorney, Agent, or Firm*—Antonelli, Terry, Stout & Kraus

[57] ABSTRACT

A controller such as a CRT controller is connected to a microprocessor via a system bus and has connecting terminals for its peripheral units. This controller is provided with a control terminal for receiving the control signal supplied from the microprocessor and control means for providing high impedance at the connecting terminal in response to the control signal. The controller having such a construction permits the microprocessor to directly access the peripheral units.

25 Claims, 3 Drawing Sheets

FIG. 2
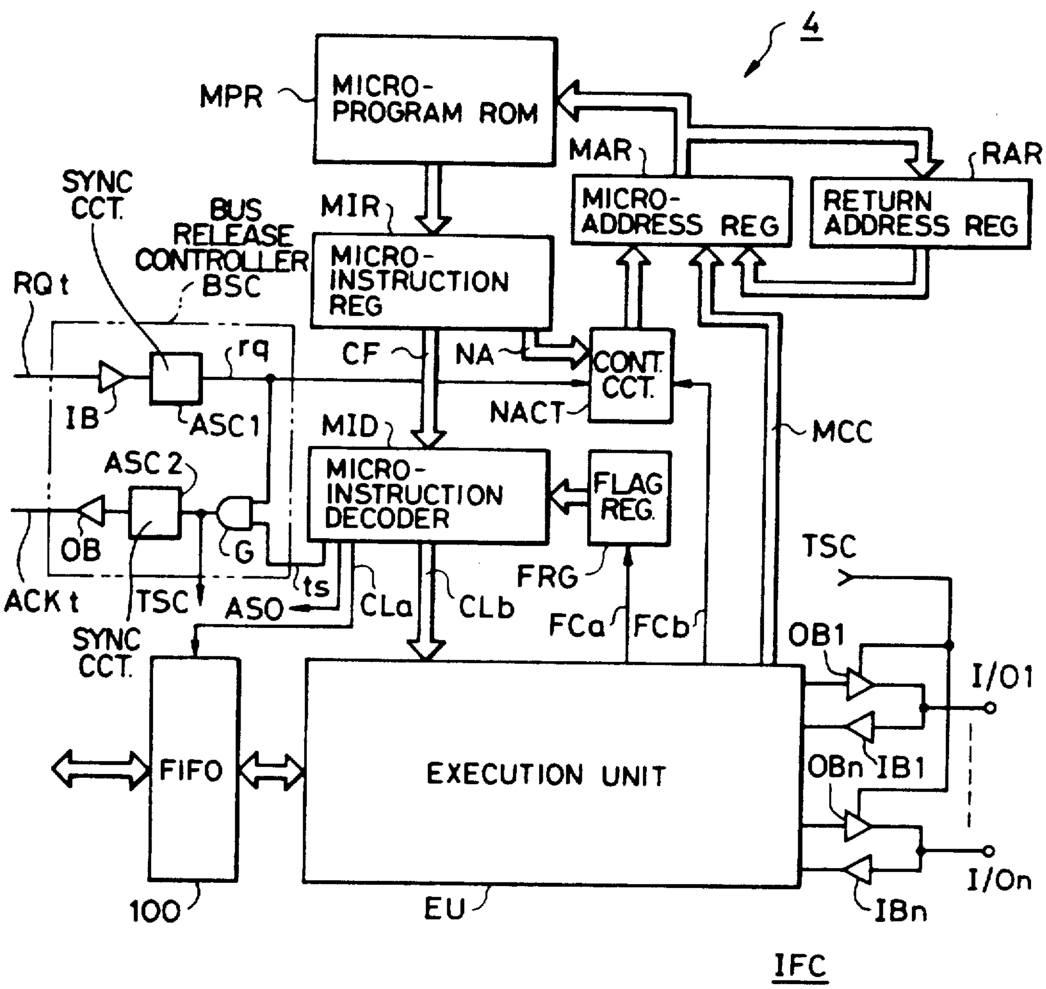
FIG. 3A
FIG. 3B
FIG. 3C
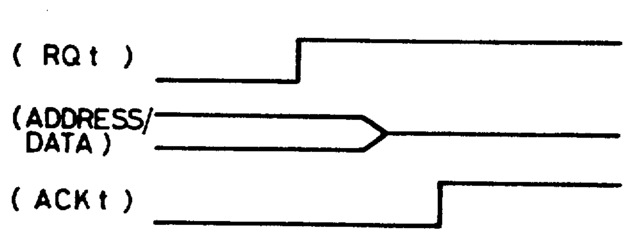

CONTROLLER WHICH ALLOWS DIRECT ACCESS BY PROCESSOR TO PERIPHERAL UNITS

This application is a continuation of application Ser. No. 886,821, filed July 18, 1986, now abandoned.

BACKGROUND OF THE INVENTION

The present invention generally relates to a system control technique, and in addition, a technique which can be effectively applied to a system for combining a microprocessor and its peripheral controller LSIs. More specifically, this invention pertains to a technique which can be effectively utilized in a CRT controller constituting a part of a system such as a personal computer which is equipped with a graphic display function, for example.

Personal computers heretofore have been known which have a CRT (cathode ray tube) display unit in a raster scanning system which is arranged to have a graphic image processing function. Such a personal computer is constituted by a system as shown in FIGS. 4A and 4B.

The systems shown in FIGS. 4A and 4B are respectively constituted by a microprocessor 1 (hereinafter referred to as an "MPU"), a system ROM 2 (or read only memory) in which a system program is stored, a working RAM 3 (or random access memory) which is used as a work area and a text area when the MPU 1 is operating, a drawing memory 5 such as a refresh memory or a frame buffer for storing the drawing data which is displayed on the CRT display unit, a CRT controller 4 for writing the drawing data into and reading it from the drawing memory 5 in accordance with the command of the MPU 1, a parallel to serial converter 6 (or a video controller) for forming and outputting a video signal such as an RGB (red, green and blue) signal on the basis of the drawing data which is read from the drawing memory 5, and so forth.

The above-described graphic display system is shown in "Nikkei Electronics", May 21, 1984, No. 343, Pgs. 225 through 227, published by Nikkei McGRAW-HILL.

Referring to FIG. 4A, the system shown has the most common construction employing a CRT controller 4 which can read from the drawing memory 5, but cannot write thereinto. In this case, although the controller 4 has a display function, it does not have any drawing function. Such a system is arranged such that the MPU 1 writes into the drawing memory 5 the drawing data which is to be displayed on the CRT display unit. Therefore, the address data which is supplied to the drawing memory 5 when the MPU 1 is to write the drawing data into the drawing memory 5 from bus 8 via bus driver 15 is not necessarily the same as the address data which is used when the CRT controller is to read the drawing data from the drawing memory 5. For this reason, the address data is supplied to the drawing memory 5 through the switching operation of a multiplexer 7.

However, since the system having such a construction is arranged such that the MPU 1 alone must perform the writing of the drawing data, this arrangement places a heavy load on the MPU 1. In addition, the address data on the drawing memory 5 must not exceed the capacity of the address space of the MPU 1, so that it is impossible to enlarge the capacity of the drawing memory 5. As a result, it has been impossible to enlarge the capacity of the drawing memory 5 in order to display multi-color data on a CRT display screen or increase the number of display screens.

In contrast, FIG. 4B shows a system construction employing a CRT controller such as HD63484 (a tradename) which has a drawing function relating to the drawing memory 5, which is connected to the CRT controller via latch circuit 16. In this system, the drawing memory 5 is perfectly separated from a system bus 8 of the MPU 1. Since such a system is arranged such that drawing data is read from and written into the drawing memory 5 exclusively via the CRT controller 4, the load borne by the MPU 1 can be greatly reduced. In addition, the address data on the drawing memory 5 may exceed the address space of the MPU 1, so that it becomes possible to enlarge the capacity of the drawing memory 5. As a result, a vivid polychrome graphic display is possible.

However, the system shown in FIG. 4B is arranged such that the drawing memory 5 is accessed exclusively via the CRT controller 4. Accordingly, this system involves such difficulties as might be caused by the fact that when DMA (direct memory access) transfer is to be performed between the RAM 3 incorporated in the system and the drawing memory 5, since the accessed data must be transferred through the CRT controller 4, the transfer speed slows down accordingly. Also, in the system shown in FIG. 4B, the MPU 1 cannot directly write into the drawing memory 5, so that it is impossible for the MPU 1 to directly execute a function or operation which is not incorporated in the CRT controller 4 (for example, the rotation of a picture image).

SUMMARY OF THE INVENTION

Accordingly, an object of the present invention is to provide a display control technique which is applied to, for example, a microcomputer system having a graphic display function, thereby increasing the processing speed such as that of DMA transfer to the drawing memory of the system and enabling flexible system design and the formulation of various application programs.

To this end, the present invention comprises a CRT controller equipped with a control terminal capable of providing high impedance at the terminal through which addresses and data are output to the drawing memory in accordance with the requirement of the MPU; and an output terminal for outputting a signal indicative of the fact that the output terminal is changed to high impedance. This arrangement permits the MPU 1 to require the CRT controller to release a bus so as to directly access the drawing memory. In consequence, the speed of processing such as DMA transfer to the drawing memory can be increased and flexible system design and the formulation of various application programs can be performed.

The above and other objects, features and advantages of the present invention will become apparent from the following description of the preferred embodiment thereof, taken in conjunction with the accompanying drawings.

BRIEF DESCRIPTION OF THE DRAWINGS

FIG. 2 is a block diagram of one preferred embodiment of the CRT controller in accordance with the present invention;

FIGS. 3A, 3B and 3C together is a timing chart which is used as an aid to the explanation of the operation of one embodiment of this invention.

DESCRIPTION OF THE PREFERRED EMBODIMENT

Figure 1:
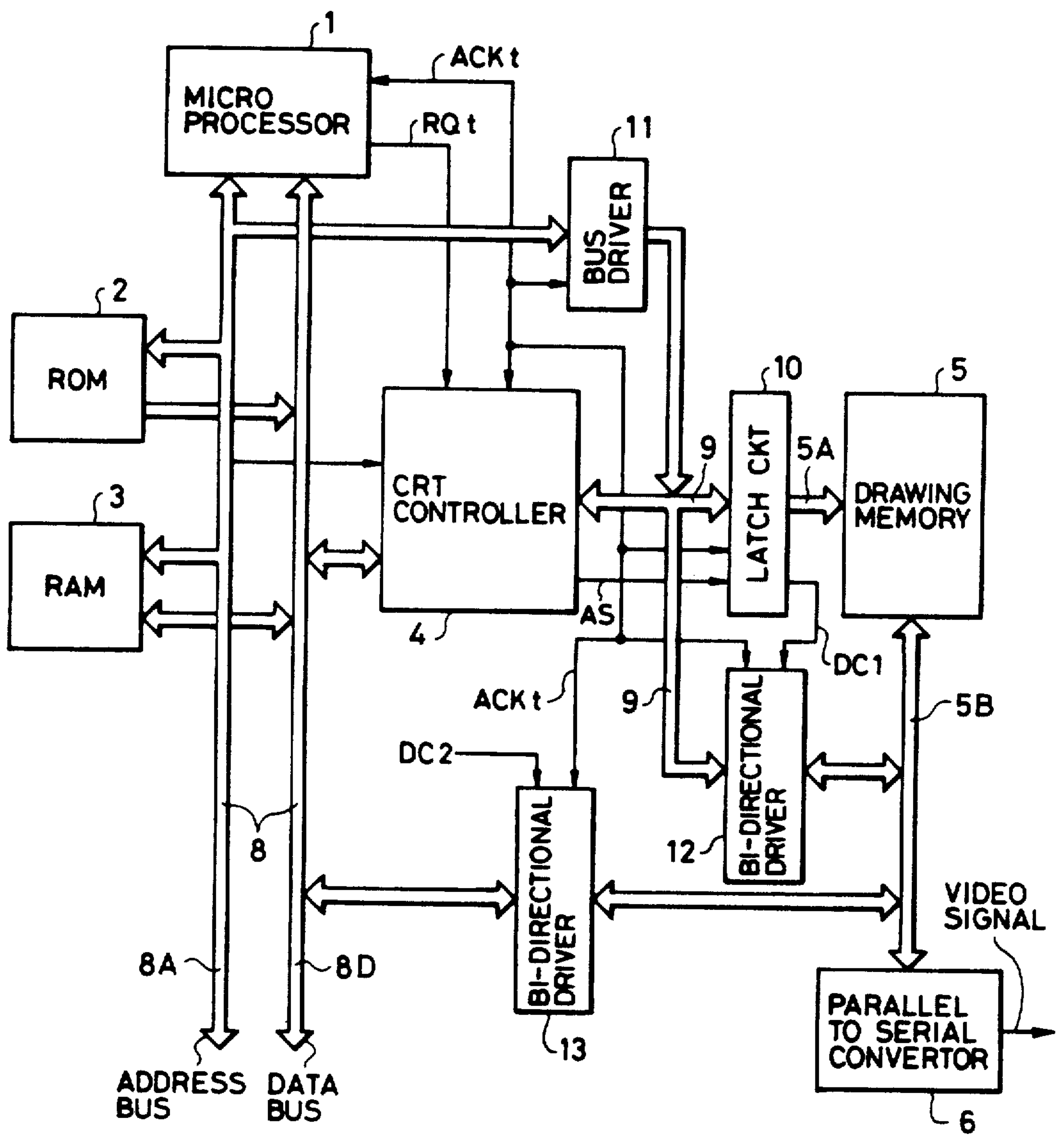
FIG. 1 is a block diagram of one preferred embodiment in which this invention is applied to a graphic display system.
Figure 4A:
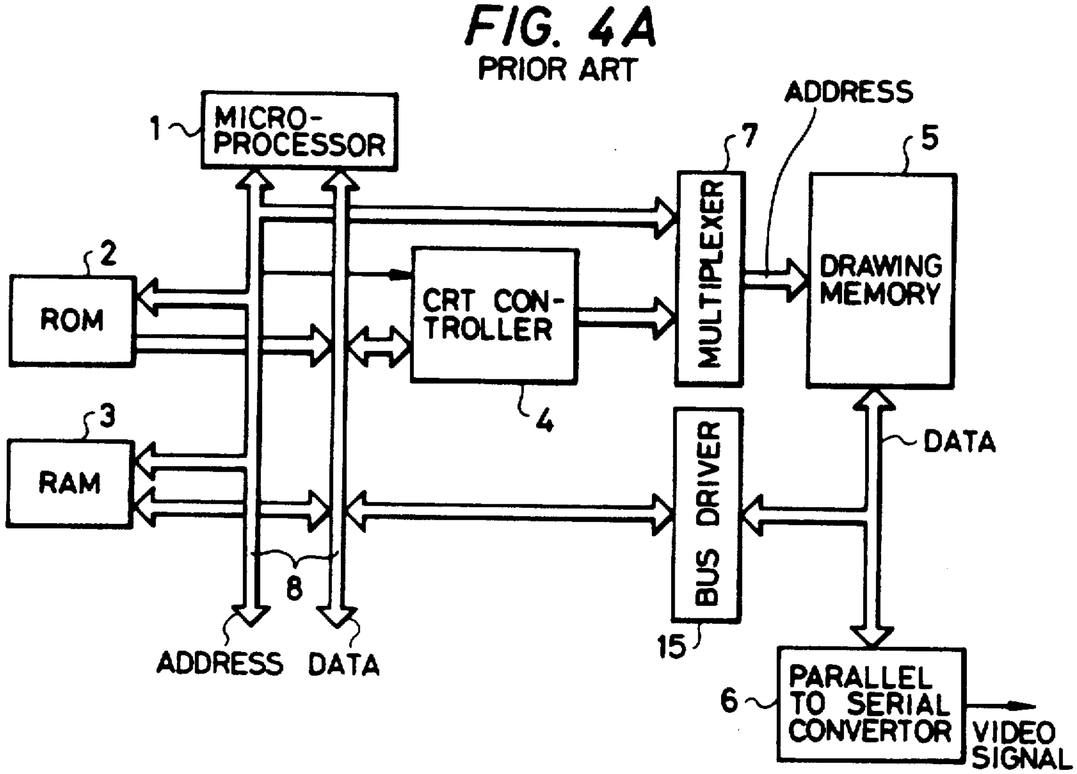
FIGS. 4(A) and 4(B) are block diagrams of examples of the constructions of conventional types of graphic display systems, respectively.
Figure 4B:
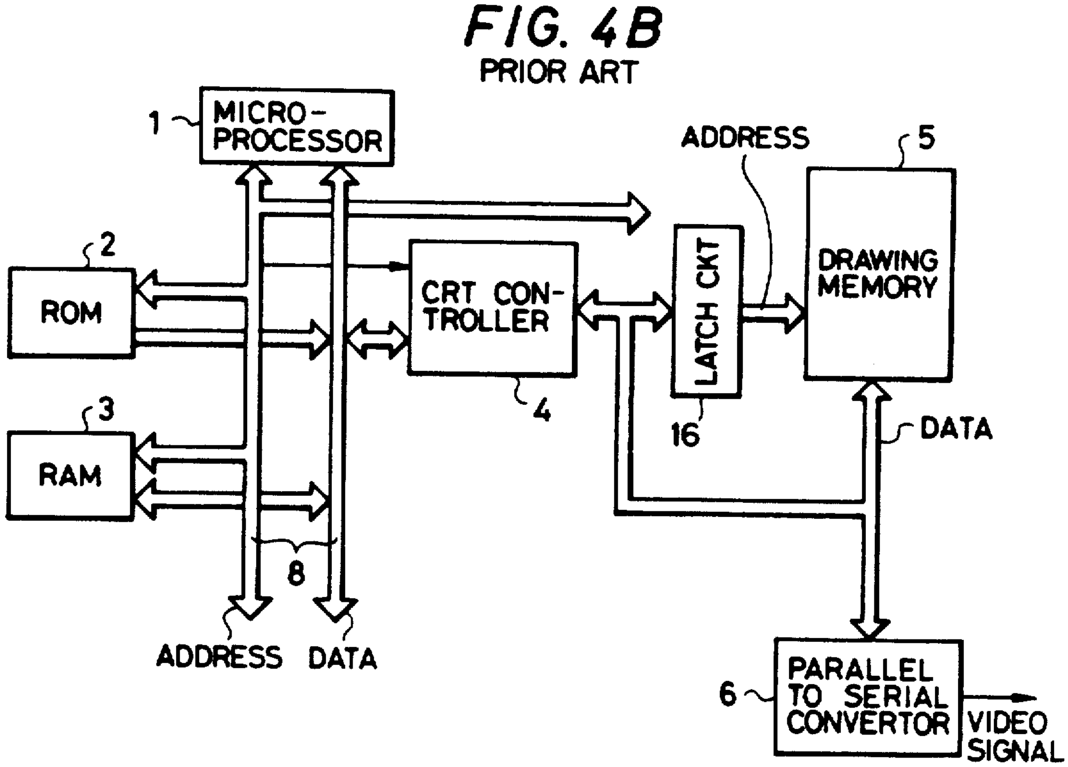

One preferred embodiment will be described below with reference to the attached drawings, and in the drawings, like reference numerals are used to denote the like or corresponding circuit elements which constitute each of the components.

FIG. 1 shows one embodiment in which the present invention is applied to a graphic display system incorporated in a personal computer.

The microprocessor 1, the system ROM 2 for storing a system program, the working RAM 3, and the CRT controller 4 are organically connected to one another via the system bus 8. A key input device and a floppy disc drive serving as a main memory, as required, are connected to the system bus 8 via an I/O device (input/output device), but they are not shown for the sake of simplicity. Furthermore, a DMA controller and so forth may be connected to the bus 8 in order to carry out the direct transfer of data between the main memory such as a floppy disc drive and the drawing memory or frame memory 5 for storing drawing data. The CRT controller 4 has a graphic display function and a drawing function. The concrete construction of the CRT controller 4 will be described in detail later with reference to FIG. 2.

The drawing memory 5 is connected to the CRT controller 4 via a bus 9. The CRT controller 4 has an input/output pin through which an address signal and a drawing data signal are supplied to the drawing memory 5 in a time-shared manner in order to reduce the required number of pins, but the CRT controller 4 is not limited to this construction. Specifically, the bus 9 constitutes a bus to which address data and image data are supplied in accordance with a multiplexing method. In order to enable this construction, an address latch circuit 10 is disposed between the bus 9 and the address terminal of the frame memory 5. The address signal which the CRT controller 4 outputs to the bus 9 is latched by the address latch circuit 10 in response to the fact that the CRT controller 4 outputs an address strobe signal AS. The address latch circuit 10 also stores the data of the bus 9 in response to the fact that a later-described acknowledge signal ACKt is set to the high level or acknowledge level, but the address latch circuit 10 is not limited to these functions.

A bidirectional driver 12 is disposed between the bus 9 and a bus 5B connected to the data input/output terminal of the drawing memory 5, and the operation of the driver 12 is controlled by a signal DC1 output by the latch circuit 10, but the control is not limited to this method. This construction permits the transfer of data from the bus 9 to the bus 5B and from the bus 5B to the bus 9. The operation of the bidirectional driver 12 is also controlled by the acknowledge signal ACKt. Specifically, if the acknowledge signal ACKt is set to the high level, the bidirectional driver 12 is set in an inactive state, namely, a high impedance state wherein the driver affects neither the bus 9 nor the bus 5B.

In accordance with this embodiment, a bus driver 11 is disposed in such a manner that a system bus 8 can be connected to the bus 9 provided between the CRT controller 4 and the drawing memory 5. This circuit arrangement permits the microprocessor 1 as well as the CRT controller 4 to directly access the drawing memory 5.

However, the above-described construction in which the drawing memory 5 can be accessed by either the microprocessor 1 or the CRT controller 4 entails the risk of causing a contention between accesses to both elements.

In order to eliminate this problem, the CRT controller 4 constituting this embodiment is provided with a control signal input terminal for receiving a control signal RQt which is supplied from the microprocessor 1 so as to require the bus 9 to be released. When the controller 4 is supplied with the control signal RQt by the microprocessor 1, it stops the operation of the internal control section in response and the address/data output terminal connected to the bus 9 is set in the state of high impedance shown in FIG. 3B. In other words, the CRT controller 4 releases the bus 9. In addition, after the CRT controller 4 has stopped the operation of the internal control section, it immediately forms an appropriate timing signal. The thus-obtained timing signal is output through a given external terminal as the acknowledge signal ACKt representative of the fact that the bus 9 is set in a floating state.

When the microprocessor 1 detects the fact that the acknowledge signal ACKt is changed, for example, from low level to high level, it correpondingly detects the fact that the bus 9 is released from the CRT controller 4. The operation of a bus driver 11 is controlled by the acknowledge signal ACKt, but the control is not limited to this method. When the acknowledge signal ACKt is set to the high level, the bus driver 11 takes the active state in response, and supplies to the bus 9 the address data of an address bus 8A constituting a part of the system bus 8.

A bidirectional driver 13 is disposed between a data bus 8D constituting the system bus 8 and the bus 5B connected to the drawing memory 5. The operation of the bidirectional driver 13 is controlled by the acknowledge signal ACKt, that is, when the acknowledge ACkt is set to the acknowledge level or high level, the driver 13 set in an active state in response, but the control is not limited to this method. The direction in which the bidirectional driver 13 transfers a signal in the active state is indicated, for example, by a control signal DC2 output by the microprocessor 1.

In consequence, it becomes possible for the microprocessor 1 to directly write drawing data into and to read it from the drawing memory 5 by accessing the memory 5 via the bus 9.

FIG. 2 is a block diagram of an example of the CRT controller 4.

The CRT controller 4, as a whole, comprises a drawing processing unit for forming the drawing data which is supplied to a frame memory in accordance with the drawing command and parameters which are supplied from the microprocessor 1; a timing processing unit for forming synchronizing and control signals for controlling the operation of a display unit; and a display processing unit for controlling display addresses within the frame memory in accordance with the format of the screen on which an image is displayed by the display unit. Basically, it may be understood that the respective processing units contain the same construction. Therefore, FIG. 2 shows only the drawing processing unit incorporated in the CRT controller 4 for the sake of simplicity.

A first-in first-out register 100 shown in FIG. 2 (hereinafter referred to as a "FIFO register") is connected to an execution unit EU in such a manner as to be capable of sequentially holding the drawing command and the parameters for graphic processing which are supplied via the data bus shown in FIG. 1. The FIFO register 100 is constructed in such a manner that it is supplied by the execution unit EU with the data to be sent to a data bus 8D, but this invention is not limited to this construction. The operation of the FIFO register is controlled by a control signal CLa output by a micro instruction decoder MID.

The drawing command which is supplied to the FIFO register 100 through the data bus 8D is transferred to and stored in a command register (not shown) within the execution unit EU. The instruction code delivered to the command register is in turn supplied to a micro address register MAR via a signal line MCC. The operation of the micro address register MAR is controlled, for example, by the control signal output by a microprogram ROM MPR, and the register MAR stores the next address supplied from a control circuit NACT, the instruction code supplied through the signal line MCC or the return address supplied from a return address register RAR. The address data output from the micro address register MAR is delivered to the microprogram ROM MPR.

The microprogram ROM MPR holds a micro instruction in each address indicated by the address register MAR.

The micro instruction output by the microprogram ROM is delivered to a micro instruction register MIR. Of the micro instruction which is supplied to the micro instruction register MIR, data NA representative of branch control data and next address data is delivered to the control circuit NACT.

The control circuit NACT which is shown in a simplified manner is constituted by a control memory for receiving the control signal output by a bus release controller BSC and flag data FCb output by the execution unit EU and a logic circuit for receiving the output of the control memory and the data NA output by the register MIR. The control circuit NACT forms the next address data for the microprogram ROM MPR on the basis of the data of the control memory and the data supplied from the register MIR.

A micro instruction CF is input to the micro instruction register MIR, and is in turn supplied to a micro instruction decoder MID.

The micro instruction decoder MID forms control signals CLa and CLb by decoding the micro instruction CF and the flag data supplied from a flag register FRG.

The operations of a command register, a general purpose register, a working register, a dedicated register for drawing parameters, an arithmetic logic unit, an interface circuit and so forth (not shown) within the execution unit EU are controlled by the control signal CLb. In response to the result of the internal operation, the execution unit EU forms flag data FCa and FCb to be supplied to the flag register FRG and the control circuit NACT.

The CRT controller having such a construction operates in the same manner as a common system of a microprogram control type. Specifically, once an instruction code based on a macro order which is supplied through the signal line MCC is stored in the micro address register MAR, a series of micro instructions corresponding to the macro instruction code are sequentially read from the microprogram ROM MPR.

A return address register is used in order to store a return address when a subroutine program is executed.

As shown in the Figure, the bus release controller BSC is constituted by an input circuit IB, a synchronizing circuits ASC1 and ASC2, a gate circuit G and an output circuit OB, but not limited to this construction. The synchronizing circuit ASC1 forms a control signal rq having an adjusted timing, in response to the control signal RQt supplied via the input circuit IB.

When the microprocessor 1 outputs the control signal RQt in order to release the bus 9 shown in FIG. 1, the control signal rq is set in the control memory within the control circuit NACT shown in FIG. 2 in response. In this case, if control data such as a branch control code contained in the data NA output from the micro instruction register MIR is set in a state wherein interrupt is permissible, the control circuit NACT outputs micro program addresses for interrupt processing. In response, a micro instruction representative of an interrupted state is read from the microprogram ROM MPR.

After the control signal rq has been supplied, if a microprogram whose interrupt is not permitted is running, that is, if the data NA and the flag data FCb and so forth which are supplied from the data NA and the execution unit EU are set in an interrupt-inhibited state, a micro instruction for interrupt processing is read out after the execution of the microprogram.

In response to the micro instruction for interrupt processing, a micro instruction decoder MID outputs a control signal ts. Furthermore, in response to the control signal ts, the gate circuit G outputs a control signal TSC. An interface circuit IFC constituted by tri state output circuits OBl to OBn and input circuits IBl to IBn is disposed between terminals I/Ol to I/On connected to the bus 9 shown in FIG. 1 and the execution unit EU, and the operation of the circuit IFC is controlled by the control signal TSC. Specifically, when the control signal TSC (or tri state control signal) is generated, the output circuits OBl to OBn are correspondingly set to a high impedance state.

The synchronizing circuit ASC2 forms an acknowledge signal in response to the control signal TSC.

When the control signal RQt is returned to the low level or uninterrupt level, the acknowledge signal ACKt is returned to the low level in response.

In the above-described embodiment, the CRT controller 4 is provided with a dedicated input terminal for receiving the control signal RQt supplied from the microprocessor 1 and a dedicated output terminal for outputting the acknowledge signal ACKt corresponding to the input terminal. However, instead of these terminals, the control terminal which the CRT controller 4 originally has can be shared for the foregoing signals.

In this case, the input terminal for the control signal RQt is arranged such that flag data is provided within the CRT controller in correspondence with the input terminal and the switch-over of the flag data is effected. The output terminal for the acknowledge signal ACKt is arranged such that a latch circuit is externally provided and is operated at an appropriate timing, thereby detecting the acknowledge signal ACkt.

In the above-described embodiment, while the system bus 8 of the microprocessor 1 is connected to the bus 9 connecting the CRT controller 4 and the drawing memory 5 via the bus device 11, this invention is not limited to this constitution. In accordance with another system construction, the system bus 8 can also be connected directly to the bus 9 without using any buffer such as a bus driver.

Furthermore, while the foregoing embodiment is arranged such that the bus 9 is used on the basis of the multiplex input/output of addresses and data, this invention is not limited to this arrangement. If the CRT controller 4 separately has an address output terminal and a data output terminal, no address latch circuit 10 is needed.

In addition, with reference to the foregoing embodiment, description has been made of a system in which either the microprocessor or the CRT controller is capable of accessing the drawing memory in order to write image data thereinto. However, this invention is not limited to this arrangement, and can be applied to a case where the drawing memory is placed under control of controller LSIs (for example, a DMA controller) other than the microprocessor and the CRT controller.

In accordance with the present invention, the following effects can be achieved.

The CRT controller is provided with a control terminal capable of providing high impedance at the terminal through which addresses and data are output to the drawing memory in accordance with the requirement of the MPU, and an output terminal for outputting a signal indicative of the fact that the output terminal is changed to high impedance. Therefore, this invention possesses the advantage in that, since the MPU can directly access the drawing memory by requiring the CRT controller to release the bus, the processing speed such as that required for DMA transfer to the drawing memory is increased, and flexible system design and the formulation of various application programs can be achieved.

In the above description, reference has mainly been made to a case where the invention is applied to a CRT controller incorporated in the graphic display system which belongs to the industrial field constituting the background of the invention, but the invention is not limited to the above-mentioned application. As will be readily understood by those skilled in the art, this invention can be generally applied to controller LSIs used for controlling peripheral units constituting a hard disc controller and other microprocessor systems.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A system comprising:

a microprocessor;

first memory means for storing information;

a first bus coupled to said microprocessor and to said first memory means;

a second bus;

second memory means coupled to said second bus for storing information;

a controller integrated circuit device couple to said first bus and to said second bus for accessing said second memory means via said second bus, said controller integrated circuit device including a first external terminal coupled to said microprocessor, a second external terminal coupled to said microprocessor, release means coupled to said microprocessor for releasing said second bus from said controller integrated circuit device in response to a first control signal supplied by said microprocessor to said first external terminal and signal generating means for generating a second control signal to be supplied to said microprocessor via said second external terminal in response to the release of said second bus from said controller integrated circuit device; and transfer means coupled between said first bus and said second bus and coupled to said second external terminal, for enabling a signal on said first bus to be transferred to said second bus in response to said second control signal supplied via said second external terminal of said controller integrated circuit device.

2. A system according to claim 1, wherein said first bus includes a first address bus and a first data bus, and said second bus includes a second address bus and a second data bus; and said transfer means includes address transfer means coupled between said first address bus and said second address bus, and data transfer means coupled between said first data bus and said second data bus.

3. A system according to claim 2, wherein said address transfer means includes means for enabling an address signal on said first address bus to be transferred to said second address bus in response to said second control signal; and said data transfer means includes means for enabling a data signal on said first data bus to be transferred to said second data bus in response to said second control signal.

4. A system comprising:

a microprocessor;

first memory means for storing information;

a first bus coupled to said microprocessor and to said first memory means;

a second bus;

second memory means coupled to said second bus for storing information;

a controller integrated circuit device coupled to said first bus and to said second bus and responsive to a command supplied via said first bus for supplying data to said second memory means via said second bus, said controller integrated circuit device including a first external terminal coupled to said microprocessor, a second external terminal coupled to said microprocessor, release means coupled to said microprocessor for releasing said second bus from said controller integrated circuit device in response to a first control signal supplied by said microprocessor to said first external terminal, and generating means for generating a second control signal to be supplied to said microprocessor via said second external terminal in response to the release of said second bus from said controller integrated circuit device; and transfer means coupled between said first bus and said second but and to said second external terminal for enabling a signal on said first bus to be transferred to said second bus in response to said second control signal provided by said second external terminal of said controller integrated circuit device.

5. A system according to claim 4, wherein said controller integrated circuit device includes third memory means for temporarily storing a plurality of commands supplied via said first bus, and means coupled to said third memory means for forming data to be transferred to said second memory means in accordance with a command provided from said third memory means.

6. A system according to claim 5, wherein said first bus includes a first address bus, and a first data bus which transfers said command to said controller integrated circuit device;

said second bus includes a second address bus, and a second data bus which transfers data to said second memory means; and said transfer means includes address transfer means coupled between said first address bus and said second address bus for enabling an address signal on said first address bus to be transferred to said second address bus in response to said second control signal, and data transfer means coupled between said first data bus and said second data bus for enabling a data signal on said first data bus to be transferred to said second data bus in response to said second control signal.

7. A system comprising:

a microprocessor;

first memory means for storing information;

a first bus coupled to said microprocessor and to said first memory means;

a second bus;

drawing memory means coupled to said second bus for storing data;

a CRT controller integrated circuit device coupled to said first bus and to said second bus for providing data, formed by processing a drawing command supplied via said first bus, to said drawing memory means via said second bus, said CRT controller integrated circuit device including a first external terminal coupled to said microprocessor, a second external terminal coupled to said microprocessor, release means coupled to said microprocessor for releasing said second bus from said CRT controller integrated circuit device in response to a request control signal supplied by said microprocessor to said first external terminal and generating means for generating an acknowledge control signal to be supplied to said microprocessor via said second external terminal in response to the release of said second bus from said CRT controller integrated circuit device; and transfer means coupled between said first bus and said second bus and coupled to said second external terminal for enabling a signal on said first bus to be transferred to said second bus in response to said acknowledge control signal supplied via said second external terminal.

8. A system according to claim 7, wherein said CRT controller integrated circuit device includes drawing memory means for temporarily storing a plurality of drawing commands supplied via said first bus, and means coupled to said drawing memory means for forming data to be transferred to said second memory means by processing a drawing command provided from said drawing memory means.

9. A system according to claim 8, wherein said first bus includes a first address bus, and a first data bus which transfers said drawing command to said CRT controller integrated circuit device;

said second bus includes a second address bus, and a second data bus which transfers data to said drawing memory means; and said transfer means includes a address transfer means coupled between said first address bus and said second address bus for enabling an address signal on said first address bus to be transferred to said second address bus in response to said acknowledge control signal, and data transfer means coupled between said first data bus and said second data bus for enabling a data signal on said first data bus to be transferred to said second data bus in response to said acknowledge control signal.

10. A system according to claim 9, further comprising video signal forming means coupled to said second data bus for forming a video signal according to a data stored in said drawing memory means.

11. A system according to claim 7, further comprising video signal forming means coupled to said drawing memory means for forming a video signal according to data stored in said drawing memory means.

12. A system according to claim 11, wherein said video signal forming means is coupled to said second bus.

13. A system comprising:

a microprocessor;

first memory means for storing information;

a first bus coupled to said microprocessor and to said first memory means;

a second bus;

drawing memory means coupled to said second bus for storing data;

a CRT controller integrated circuit device coupled to said first bus and to said second bus for providing data, formed by processing a drawing command applied via said first bus, to said drawing memory means via said second bus, said CRT controller integrated circuit device including a first external terminal coupled to said microprocessor, a second external terminal coupled to said microprocessor, first means coupled to said microprocessor for releasing said second bus from said CRT controller integrated circuit device in response to a request control signal supplied by said microprocessor to said first external terminal and second means coupled to said first means for generating an acknowledge control signal for indicating the release of said second bus from said CRT controller means said acknowledge control signal being supplied to said microprocessor via said second external terminal; and transfer means coupled between said first bus and said second bus and coupled to said second external terminal for enabling a signal on said first bus to be transferred to said second bus in response to said acknowledge control signal supplied by said CRT controller integrated circuit device via said second external terminal.

14. A system according to claim 13, wherein said CRT controller integrated circuit device includes third memory means for temporarily storing a plurality of drawing commands supplied via said first bus, and means coupled to said drawing memory means for forming data to be transferred to said drawing memory means by processing a drawing command provided from said third memory means.

15. A system according to claim 14, wherein said first bus includes a first address bus, and a first data bus which transfers said drawing commands to said CRT controller integrated circuit device;

said second bus includes a second address bus, and a second data bus which transfers data to said drawing memory means; and said transfer means includes an address transfer means coupled between said first address bus and said second address bus for enabling in address signal on said first address bus to be transferred to said second address bus in response to said acknowledge control signal, and data transfer means coupled between said first data bus and said second data bus for enabling a data signal on said first data bus to be transferred to said second data bus in response to said acknowledge control signal.

16. A system according to claim 15, further comprising video signal forming means coupled to said second data bus for forming a video signal according to a data stored in said drawing memory means.

17. A system according to claim 13, further comprising video signal forming means coupled to said drawing memory means for forming a video signal according to data stored in said drawing memory means.

18. A system according to claim 17, wherein said video signal forming means is coupled to said second bus.

19. A system comprising:

a microprocessor;

first memory means for storing information;

a first bus coupled to said microprocessor and to said first memory means;

a second bus;

drawing memory means coupled to said second bus for storing data;

a CRT controller integrated circuit device coupled to said first bus and to said second bus for providing data, formed by processing a drawing command applied via said first bus, to said drawing memory means via said second bus, said CRT controller integrated circuit device including a first external terminal coupled to said microprocessor, a second external terminal coupled to said microprocessor, first means coupled to said microprocessor for releasing said second bus from said CRT controller integrated circuit device in response to a request control signal supplied by said microprocessor to said first external terminal, second means responsive to said request control signal for stopping the operation of an internal control section, and third means coupled to said first means for generating an acknowledge control signal for indicating the release of said second bus from said CRT controller means said acknowledge control signal being supplied to said microprocessor via said second external terminal; and transfer means coupled between said first bus and said second bus and coupled to said second external terminal for enabling a signal on said first bus to be transferred to said second bus in response to said acknowledge control signal supplied by said CRT controller integrated circuit device via said second external terminal.

20. A system according to claim 19, wherein said CRT controller integrated circuit device includes third memory means for temporarily storing a plurality of drawing commands supplied via said first bus, and means coupled to said drawing memory means for forming data to be transferred to said drawing memory means by processing a drawing command provided from said third memory means.

21. A system according to claim 20, wherein said first bus includes a first address bus, and a first data bus which transfers said drawing commands to said CRT controller integrated circuit device;

said second bus includes a second address bus, and a second data bus which transfers data to said drawing memory means; and said transfer means includes an address transfer means coupled between said first address bus and said second address bus for enabling an address signal on said first address bus to be transferred to said second address bus in response to said acknowledge control signal, and data transfer means coupled between said first data bus and said second data bus for enabling a data signal on said first data bus to be transferred to said second data bus in response to said acknowledge control signal.

22. A system according to claim 21, further comprising video signal forming means coupled to said second data bus for forming a video signal according to data stored in said drawing memory means.

23. A system according to claim 19, further comprising video signal forming means coupled to said drawing memory means for forming a video signal according to data stored in said drawing memory means.

24. A system according to claim 23, wherein said video signal forming means is coupled to said second bus.

25. A system comprising:

a microprocessor;

first memory means for storing information;

a first bus coupled to said microprocessor and to said first memory means;

a second bus;

second memory means coupled to said second bus for storing information;

a controller integrated circuit device coupled to said first bus and to said second bus for accessing said second memory means via said second bus, said controller integrated circuit device including a first external terminal coupled to said microprocessor, a second external terminal coupled to said microprocessor, release means coupled to said microprocessor for releasing said second bus from said controller integrated circuit device in response to a first control signal supplied by said microprocessor to said first external terminal, means responsive to said first control signal for stopping the operation of an internal control section, and signal generating means for generating a second control signal for indicating the release of said second bus from said controller integrated circuit device, said second control signal supplied to said microprocessor via said second external terminal; and transfer means coupled between said first bus and said second bus and coupled to said second external terminal, for enabling a signal on said first bus to be transferred to said second bus in response to said second control signal supplied via said second external terminal of said controller integrated circuit device.

* * * * *